(Model.)
W. F. COOK.
PHOTOGRAPHIC CAMERA.
No. 595,468.   Patented Dec. 14, 1897.
2 Sheets—Sheet 1.
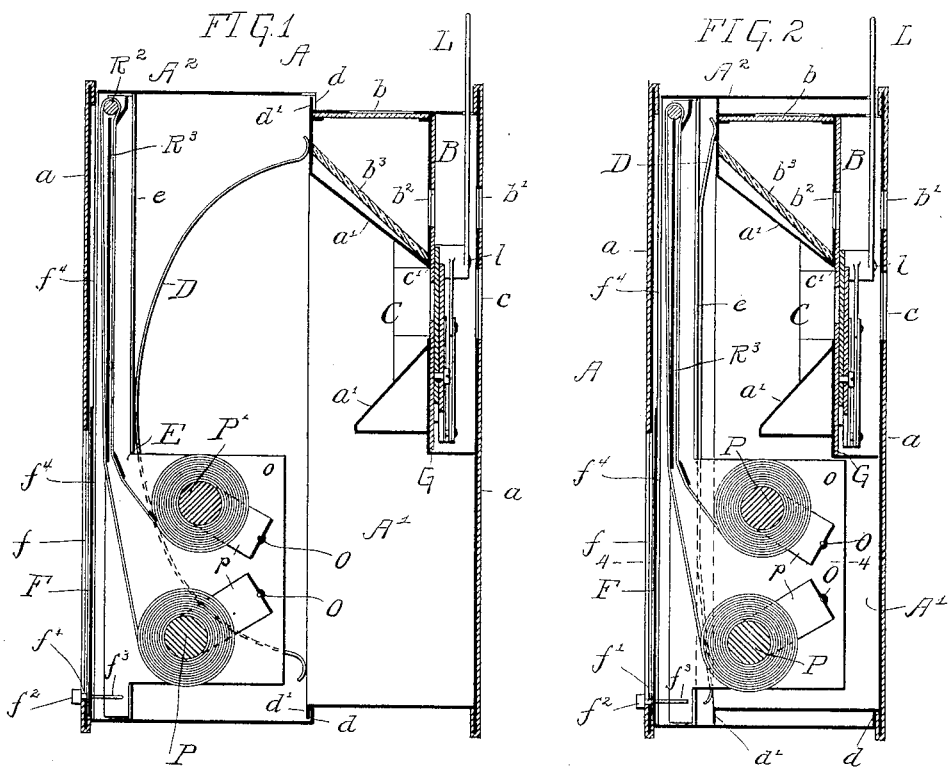
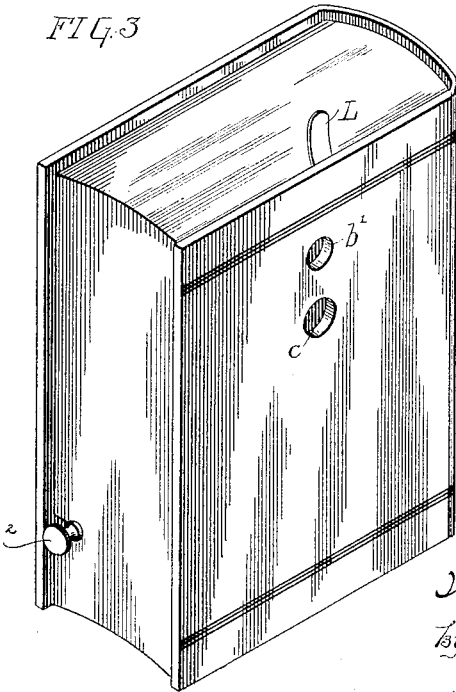
Witnesses:
Jno. G. Parker
David B. Yergen
Inventor:
William F. Cook
by his Attorney,
Walter E. Talmore
THE NORRIS PETERS CO., PHOTO-LITHO., WASHINGTON, D. C.

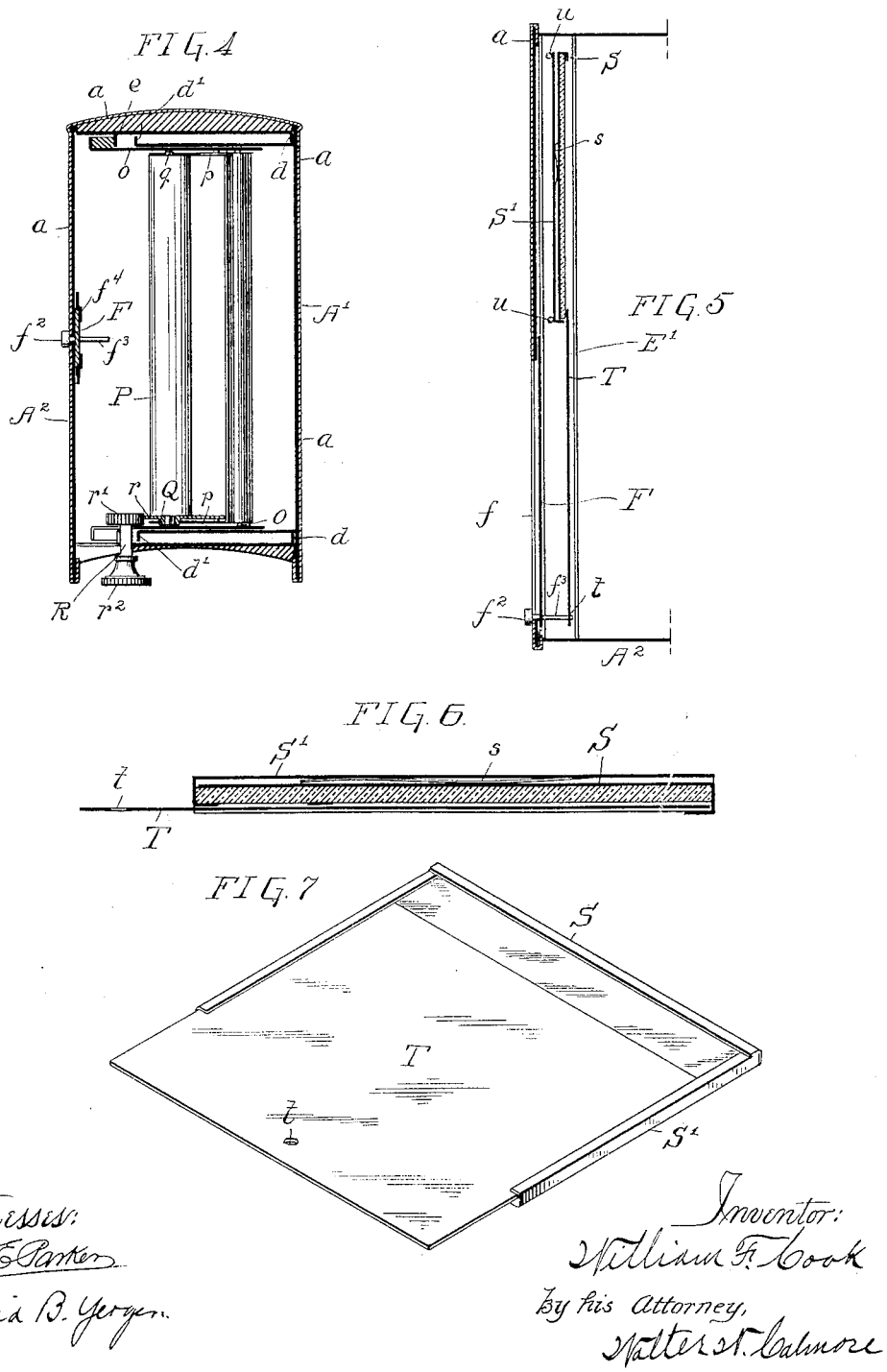

UNITED STATES PATENT OFFICE.

WILLIAM F. COOK, OF IVY MILLS, PENNSYLVANIA.

PHOTOGRAPHIC CAMERA.

SPECIFICATION forming part of Letters Patent No. 595,468, dated December 14, 1897.

Application filed May 12, 1896. Renewed June 30, 1897. Serial No. 643,007. (Model.)

*To all whom it may concern:*

Be it known that I, WILLIAM F. COOK, a citizen of the United States, residing at Ivy Mills, in the county of Delaware and State of Pennsylvania, have invented certain new and useful Improvements in Photograph-Cameras, of which the following is a specification, reference being had therein to the accompanying drawings.

My invention relates to certain improvements in photograph-cameras, and has for its object to construct a camera which when not in use may be carried around in the pocket or hand, being of small compass and preferably made in such manner as to resemble both in form and appearance an ordinary bound book.

A further object is to make a camera of this character with a collapsible frame or case, so that it may be opened out when in use, and by increasing the distance between the lens and the sensitive plate or film make it possible to increase the size of the photograph.

A still further object of the invention is to provide in such a camera for the taking of photographs either on a film or on a dry-plate; and a still further object is to so construct the shutter mechanism that it may be employed without tedious adjustment for the taking of either time or instantaneous photographs.

In the accompanying drawings, Figure 1 is a sectional elevation of a camera constructed in accordance with my invention, showing the camera-case opened out in readiness for use. Fig. 2 is a similar view showing the camera-case in the closed position. Fig. 3 is a perspective view of the camera. Fig. 4 is a sectional plan view of the same on the line 4 4, Fig. 2. Fig. 5 is a sectional elevation illustrating the camera as arranged for taking photographs on dry-plates. Fig. 6 is a sectional view, on an enlarged scale, of one of the dry-plate holders. Fig. 7 is a perspective view of the same.

Referring to the drawings, A represents the casing of the camera, made in two main sections $A'$ $A^2$, telescopically adjusted to each other, so that they may be opened out, as shown in Fig. 1, or closed, as shown in Fig. 2.

The two sections are preferably made of wood or sheet metal shaped to correspond to the shape of a bound book and preferably provided with coverings $a$, of leather, so as to more perfectly imitate a book.

The section $A'$ has openings $b$ $b'$ $b^2$, one of which, $b$, is in line with a mirror $b^3$, set at an angle to the center of the opening and serving to reflect the picture seen through the openings $b'$ $b^2$, the two latter openings being in line with each other, as shown, and the whole forming the ordinary focusing or centering device of the ordinary camera.

In one face of the section $A'$ is an opening $c$ in line with a second opening $c'$, in which is set the lens C, the latter being of any ordinary construction and not illustrated in detail in the drawings. Immediately back of that face of the section $A'$ in which the openings are formed is a chamber B for the reception of the shutter mechanism.

In the section $A'$ are the usual blackened and inclined plates $a'$ to limit the range of focus.

The section $A^2$ is provided with an inwardly-turned flange or rim $d$, and the section $A'$ has an outwardly-turned flange or rim $d'$, which fit together, as shown in Fig. 1, and serve to limit the movement of the two sections relative to each other.

In the section $A^2$ are two springs D, arranged one at each side of the casing and having their central portions secured to the section $A^2$ and their free ends bearing upon the flange or rim $d'$ of the section $A'$, the springs normally tending to separate the sections, but being normally prevented from so doing by suitable locking-catches of any preferred form, which are employed to secure the sections together.

Within the section $A^2$ is arranged a frame E or $E'$ for the support of the film or dry-plate, the construction of which is more particularly described hereinafter, and in the rear face of the casing is formed a slot $f$, through which extends a pin $f'$, having a suitable operating handle or knob $f^2$. This pin is secured to a slide F, having a projecting pin $f^3$ for engagement with the slide of the dry-plate holder and is guided in ways $f^4$, formed on or secured to the inner face of the rear wall of the casing, the whole being so arranged that when the slide F is drawn down to expose a plate it will cover the groove or slot $f$ and prevent the entrance of light to the interior of the camera.

Turning now to the film and plate holding frames, if the camera is to be used with a continuous film it is preferred to employ a frame such as illustrated in Figs. 1, 2, and 4, and if a dry-plate is to be used it is preferred to employ a frame such as shown in Fig. 5, although, if desired, the two frames may be readily so combined that one frame may be used either for film or dry-plates.

Referring to Figs. 1, 2, and 4, E represents the frame, made of any suitable material and adapted to be supported within the section A' by suitable flanges $e$. On this frame are depending wings $o$, in which are journaled pins O, carrying crank-arms $p$ for the support of the film-carrying rollers P P', the ends of the roll P being reduced in diameter and having one round end $q$, adapted to fit in an opening in one of the crank-arms, and the opposite end being squared or rectangular in form and fitting in a square or rectangular opening in a socket-piece Q, so mounted as to turn freely in the opposite crank-arm and carrying a gear-wheel $r$, which intermeshes with a pinion $r'$ on a handled shaft R, the handle or turning-knob $r^2$ being on the exterior of the casing, so that it may be readily turned to wind up the film which has been exposed.

At the end of the frame E is a roller $R^2$, over which the film passes, and the exposed portion is protected by a wooden or metallic backing-plate $R^3$, as shown. The mounting of these film-rollers on crank-arms facilitates their removal from the camera and their readjustment when newly filled with fresh film.

The dry-plate holder, as shown more clearly in Figs. 5, 6, and 7, comprises a backing-piece S, having one edge turned to protect the edge of the plate, and a second plate S', also having one edge turned to protect and cover the opposite edge of the plate, the two pieces being held apart to make frictional contact with the covering-plate and held in position by means of a plate-spring $s$. The piece S' has its edges so turned or flanged as to form a guide for the removable slide or cover T, in which is an opening $t$ for the engagement of a pin $f^3$ on the slide F.

The plate-holder is held in position by bars $u$, and these may be arranged to guide the film, if the latter is to be employed, while the protecting-plate $R^3$ may be made removable for the substitution of the plate-holder, so that only one combination-frame need be employed for both film and dry-plates.

Having thus described my invention, what I claim, and desire to secure by Letters Patent, is—

1. The combination in a camera, of the casing formed of two main sections A', $A^2$, the section A' being adapted to slide telescopically within the section $A^2$, a lens, shutter and focusing device carried by the section A', a removable film-carrying frame carried by the section $A^2$, film-rolls journaled in said frame, and devices for guiding said film to a point in line with the lens, substantially as specified.

2. The combination in a camera, of the casing formed of two main sections A', $A^2$, the section A' being adapted to slide telescopically within the section $A^2$, springs normally tending to separate said sections, a lens, shutter, and focusing device carried by the section A' at a point within and at the upper portion of said section, and film-carrying rolls provided in the section $A^2$ at the lower portion of said section, so that when the sections are closed the operative parts may pass each other and be confined in a small space, substantially as specified.

3. The combination in a camera, of the casing formed of two main sections A', $A^2$, an inwardly-turned flange $d$ on the section $A^2$, an outwardly-turned flange on the section A', a removable frame E, for the support of the film-carrying frame or dry-plate in the section $A^2$, a chamber B formed in the section A', a shutter mechanism in said chamber, an operating-lever L extending from said shutter mechanism through a slot in the section A', and a lens and focusing device carried by the section A', substantially as specified.

4. The combination with the camera, of a plate-holder comprising a main body portion adapted to carry the sensitive plate, a slide or cover normally protecting the plate from exposure, a sliding operating device guided in the rear portion of the camera-frame, a pin connecting the operating device to the slide or cover, and an operating-pin on the sliding operating device extending through a slot in the camera-frame, substantially as specified.

5. The combination with the frame, of a plate-holder comprising a backing-plate S having one edge flanged to protect the edge of the sensitive plate, a second plate S' also flanged to protect the remaining edges of the plate, a spring $s$ situated between the plates S, S', and a removable slide or cover T guided in the flanged edges of the plates S, S', substantially as specified.

6. The combination with the frame or casing having a slot $f$, of a slide F adapted to guides on the casing, a pin $f'$ carried by said slide and extending through the slot $f$, a plate-holder having a removable slide or cover T and a pin $f^3$ on said slide F adapted to engage in an opening formed in said slide or cover, substantially as specified.

In testimony whereof I affix my signature in the presence of two witnesses.

WILLIAM F. COOK.

Witnesses:
RUSSELL T. BOSWELL,
WALTER W. CALMORE.